US011345351B2

(12) United States Patent
Appleton (10) Patent No.: US 11,345,351 B2
(45) Date of Patent: May 31, 2022

(54) SYSTEM AND METHOD FOR ADAPTIVE PTO DROOP

(71) Applicant: Deere & Company, Moline, IL (US)

(72) Inventor: Andy B. Appleton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/086,799

(22) Filed: Nov. 2, 2020

(65) Prior Publication Data
US 2022/0135038 A1    May 5, 2022

(51) Int. Cl.
*B60W 10/06* (2006.01)
*B60W 30/188* (2012.01)
*B60W 10/10* (2012.01)

(52) U.S. Cl.
CPC ........ *B60W 30/1888* (2013.01); *B60W 10/06* (2013.01); *B60W 10/10* (2013.01); *B60W 2300/00* (2013.01); *B60W 2510/0657* (2013.01); *B60W 2710/0644* (2013.01); *B60W 2710/1005* (2013.01); *B60W 2720/10* (2013.01); *B60W 2720/12* (2013.01)

(58) Field of Classification Search
CPC .. B60W 30/1888; B60W 10/10; B60W 10/06; B60W 2710/0644; B60W 2710/1005; B60W 2510/0657; B60W 2720/10; B60W 30/1882; B60W 30/1884; B60W 2300/15; B60W 2300/17; B60W 10/101; B60W 10/103
USPC ..................................................... 701/50, 56
See application file for complete search history.

(56) References Cited

U.S. PATENT DOCUMENTS

| 5,526,261 | A | 6/1996 | Kallis et al. |
| 7,234,366 | B2 | 6/2007 | Hou |
| 8,410,737 | B2 | 4/2013 | Wu et al. |
| 8,538,639 | B2 * | 9/2013 | Noll ........................ F16H 61/47 701/50 |
| 9,635,806 | B2 * | 5/2017 | Waitt ................... A01D 34/006 |
| 10,352,255 | B2 | 7/2019 | Pipho et al. |

(Continued)

FOREIGN PATENT DOCUMENTS

| DE | 102011086827 A1 * | 5/2013 | ............ B60W 10/30 |
| EP | 2105337 A1 | 9/2009 | |

OTHER PUBLICATIONS

German Search Report issued in German Patent Application No. 102021210843.1, dated Mar. 30, 2022, 10 pages.

*Primary Examiner* — Roger L Pang
(74) *Attorney, Agent, or Firm* — Gary L. Montle; Lucian Wayne Beavers; Patterson Intellectual Property Law, PC (57) ABSTRACT

Systems and methods are disclosed herein for adaptive power take-off (PTO) droop control for a self-propelled work vehicle having an engine and a PTO device directly mechanically coupled to the engine. The systems and methods enable user selection of at least one of a target ground speed or a target power take off (PTO) speed. The systems and methods are responsive to at least one of the selected target ground speed or the selected target PTO speed to identify a maximum transmission ground drive efficiency corresponding to an effective droop value within a defined droop range. The systems and methods control an actual engine speed and an actual transmission ratio to respective adjusted target values corresponding with the maximum transmission ground drive efficiency.

20 Claims, 7 Drawing Sheets

(56) References Cited

U.S. PATENT DOCUMENTS

| | | | |
|---|---|---|---|
| 10,477,759 B2* | 11/2019 | Matsuda | ............... A01D 34/78 |
| 10,697,151 B2 | 6/2020 | Bozdech et al. | |
| 2005/0211528 A1 | 9/2005 | Hou | |
| 2010/0192907 A1 | 8/2010 | Stemler et al. | |
| 2016/0016588 A1 | 1/2016 | Sereni et al. | |
| 2019/0202378 A1* | 7/2019 | Hartman | ............... B60W 10/06 |

* cited by examiner

SYSTEM AND METHOD FOR ADAPTIVE PTO DROOP

FIELD OF THE DISCLOSURE

The present disclosure relates generally to self-propelled work vehicles with an engine and a PTO device directly mechanically coupled to the engine and configured for coupling with attachment implements, and more particularly to systems and methods for maximizing transmission ground drive efficiency.

BACKGROUND

Self-propelled work vehicles as discussed herein may for example include tractors and other equipment which include a power take-off (PTO) device directly coupled to an engine (e.g., an internal combustion engine). In other words, the work vehicle has a fixed drive ratio between the engine speed and PTO device. The PTO of the self-propelled work vehicle is configured to be coupled to a PTO implement used for modifying the terrain, moving materials, or equivalent working conditions in which the vehicle is moving at a ground speed relative to the ground while providing power to the PTO driven device. The term "implement" as used herein may accordingly encompass for example buckets, grapples, blades, hammers, compactors, forked lifting devices, brushes, augers, and the like.

Engine governors are typically used to control engine speed. Some governors control the engine speed set point as a function of the load on the engine. This is commonly referred to as droop. Many vehicle applications use a positive droop function, where the governor decreases the speed set point as the engine load increases. Positive droop can provide feedback to an operator that the load on the engine is increasing and can make the engine speed control more stable. Droop functions are typically preset via either hardware or software. Such preset droop functions, however, may not be able to optimize various factors such as operator feel, engine performance, and fuel economy.

Some of these self-propelled work vehicles utilize a continuously variable transmission, an example of which includes an infinitely variable transmission (IVT) which includes a performance surface map of optimal operation. The PTO device, however, typically does not take IVT ground drive efficiency into account when functioning.

BRIEF SUMMARY

The current disclosure generally describes control systems and methods for addressing aforementioned problems by automatically and programmatically adjusting PTO droop to target optimal transmission ground drive efficiencies.

In one embodiment, a method of adaptive power take-off (PTO) droop control is disclosed herein for a self-propelled work vehicle having an engine directly mechanically coupled to a PTO device. The method includes the step of enabling user selection of at least a target ground speed. The method further includes the step of, responsive to at least the selected target ground speed, identifying a maximum transmission ground drive efficiency corresponding to any of a plurality of effective droop values within a defined droop range. The method additionally includes the step of controlling an actual engine speed and an actual transmission ratio to respective adjusted target values corresponding with the maximum transmission ground drive efficiency.

In one exemplary aspect of the above-referenced embodiment, the maximum transmission ground drive efficiency may be identified by reference to portions of a transmission ground drive efficiency curve corresponding to the defined droop range and as represented in a transmission efficiency map retrievably stored (i.e., predetermined and/or learned) in association with the work vehicle.

In another exemplary aspect of the above-referenced embodiment, the transmission efficiency map may be generated for the work vehicle based on recorded or modeled transmission ground drive efficiency values over time correlated to different operating conditions.

In another exemplary aspect of the above-referenced embodiment, the transmission efficiency map may be retrieved based on the selected target ground speed.

In another exemplary aspect of the above-referenced embodiment, an initial target PTO speed may be selectable by the user via a user interface associated with the work vehicle, the PTO speed having a corresponding initial target engine speed.

In another exemplary aspect of the above-referenced embodiment, the defined droop range may be further selectable by the user via the user interface.

In another exemplary aspect of the above-referenced embodiment, the step of controlling may be selectively enabled or disabled by the user via the user interface.

In another exemplary aspect of the above-referenced embodiment, a PTO state may be detected via input signals from a PTO state sensor indicating whether the PTO device is engaged.

In another exemplary aspect of the above-referenced embodiment, the method may further comprise reacting to a load on the engine and reactively changing the adjusted target values corresponding with the maximum transmission ground drive efficiency.

In another exemplary aspect of the above-referenced embodiment, the method may further comprise anticipating a load on the engine and proactively changing the adjusted target values corresponding with the maximum transmission ground drive efficiency.

In another embodiment, an adaptive power take-off (PTO) droop control system is disclosed herein for a self-propelled work vehicle having an engine directly mechanically coupled to a PTO device. The system includes at least a user interface and a controller, and is configured to direct the performance of steps according to the above-referenced method and optionally one or more of the aspects thereof.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-7, various embodiments may now be described of a system and method for controlling a transmission ratio and engine speed of a self-propelled work vehicle (or work vehicle) having an engine directly mechanically coupled to a power take-off (PTO) device. In other words, the work vehicle has a fixed drive ratio between the engine speed and PTO device. The self-propelled work vehicle may, example be, a tractor or other work vehicle having a PTO output mechanically coupled to the engine. The PTO device as generally discussed herein may, for example, represent a PTO coupling of the vehicle and/or a PTO implement coupled thereto.

Figure 1:
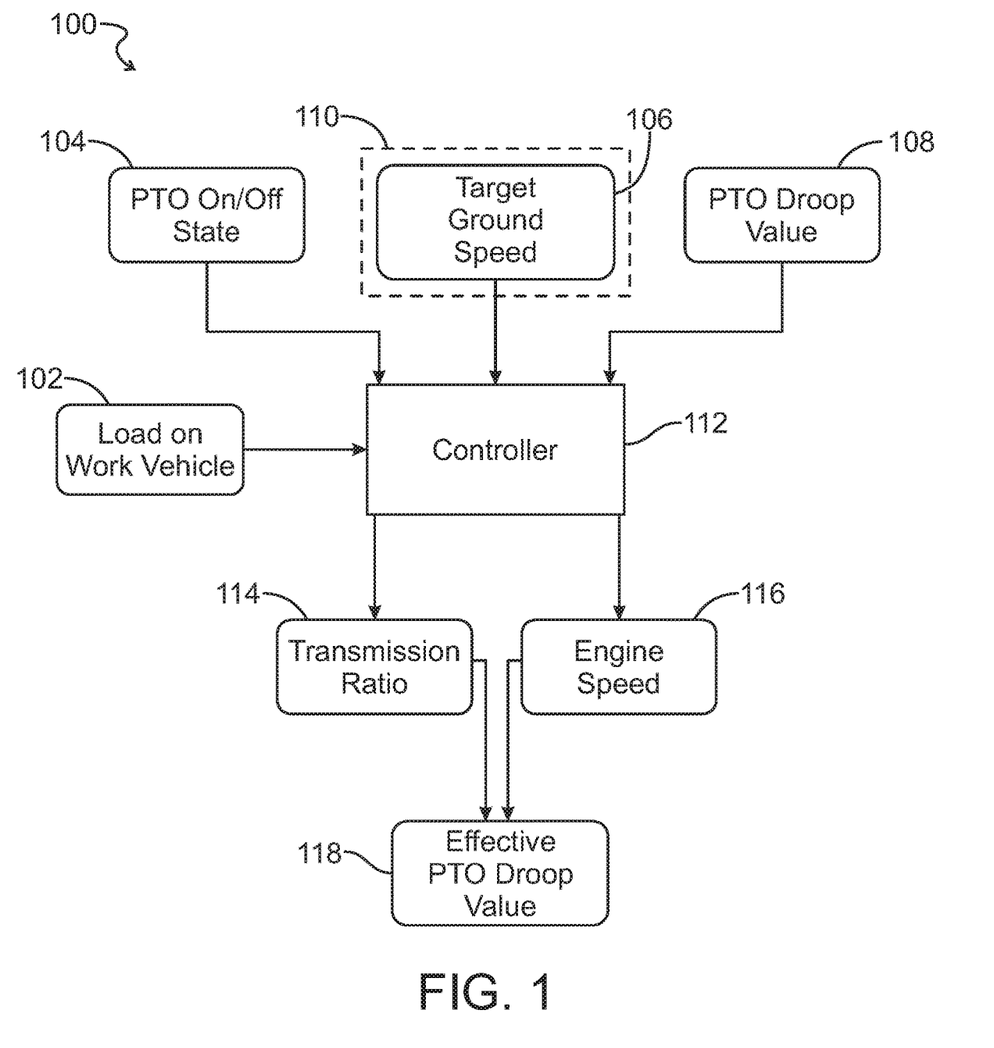
FIG. 1 is a block diagram representing an exemplary droop control system.

With reference to FIG. 1, an exemplary droop control system 100 for a self-propelled work vehicle may take into account a load 102 on the work vehicle, a PTO operating state 104, a target ground speed 106, and a selected PTO droop value 108. The droop control system 100 further includes a user interface 110 that may be utilized by an operator (or user) of the work vehicle to select at least the target ground speed 106 and the selected PTO droop value 108. The load 102 on the work vehicle may more specifically refer to an operating load of the engine of the work vehicle, which may depend at least in part on the particular PTO device coupled thereto. The load 102 may be sensed via a sensor or calculated using a controller 112 or an equivalent processing or computing device. Information regarding the load 102 on the work vehicle, the PTO operating state 104, the target ground speed 106, and the PTO droop value 108 (collectively "inputs") may be received by a controller 112 of the droop control system 100. An engine governor as previously noted for engine speed control may be separate from (not shown) or otherwise integrated with the controller 112.

The PTO operating state 104 may include information regarding a target PTO speed. Alternatively, the target PTO speed may be selectable by a user via the user interface 110. The PTO operating state 104 may be controlled by an operator via the user interface 110. Alternatively, the PTO operating state 104 may be controlled from a source other than the user interface 110 or the controller 112.

A target engine speed of the engine of the work vehicle is a set ratio (or function) of the target PTO speed. The actual engine speed of the work vehicle may depend at least in part on the target engine speed, the selected PTO droop value 108, and the load 102. Accordingly, the actual engine and PTO speeds may droop (e.g., fall below the target engine and PTO speeds) due to the load 102.

The term "droop" as used herein may generally refer to an amount the engine (e.g., the engine speed) of the work vehicle is lugged down in response to load, for example before the transmission of the work vehicle downshifts to prevent over-lugging or stalling the engine in the context of droop control as further described herein. This phenomenon may also be referred to as positive droop. For example, a selected PTO droop value 108 of 20% and a target engine speed of 2100 rpm means that the transmission of the work vehicle will downshift once the actual engine speed is lugged down to 1680 rpm (e.g., a drop in engine speed of 20%). Further for example, a selected PTO droop value 108 of 6% and a target engine speed of 2100 rpm means that the transmission of the work vehicle will downshift once the actual engine speed is lugged down to 1974 rpm (e.g., a drop in engine speed of 6%).

One of skill in the art may appreciate that the engine of the self-propelled work vehicle may be controlled by signals originating from or otherwise transmitted via the controller 112 or from a dedicated engine control module (not shown), and that the transmission may likewise be controlled by signals originating from or otherwise transmitted via the controller 112 or from a dedicated transmission control module (not shown). Such engine control module and transmission control module may be in electrical communication with one another and optionally with various of the sensors described herein via a communication or Controller Access Network (CAN bus) link.

The controller 112 of the droop control system 100 adjusts a transmission ratio 114 of the work vehicle and an engine speed 116 of the work vehicle based at least in part on the load 102 on the work vehicle, the PTO operating state 104, the target ground speed 106, and the PTO droop value 108. The transmission ratio 114 and the engine speed 116 produce an effective PTO droop value 118. The controller 112 adjusts the transmission ratio 114 and the engine speed 116 to achieve the target ground speed 106 and to match the effective PTO droop value 118 with the selected PTO droop value 108. The transmission efficiency is a function of the engine speed 116 and the transmission ratio 114. Because the transmission ratio 114 and the engine speed 116 are limited by the selected PTO droop value 108, so too is the transmission efficiency, which is not optimal.

Figure 2:
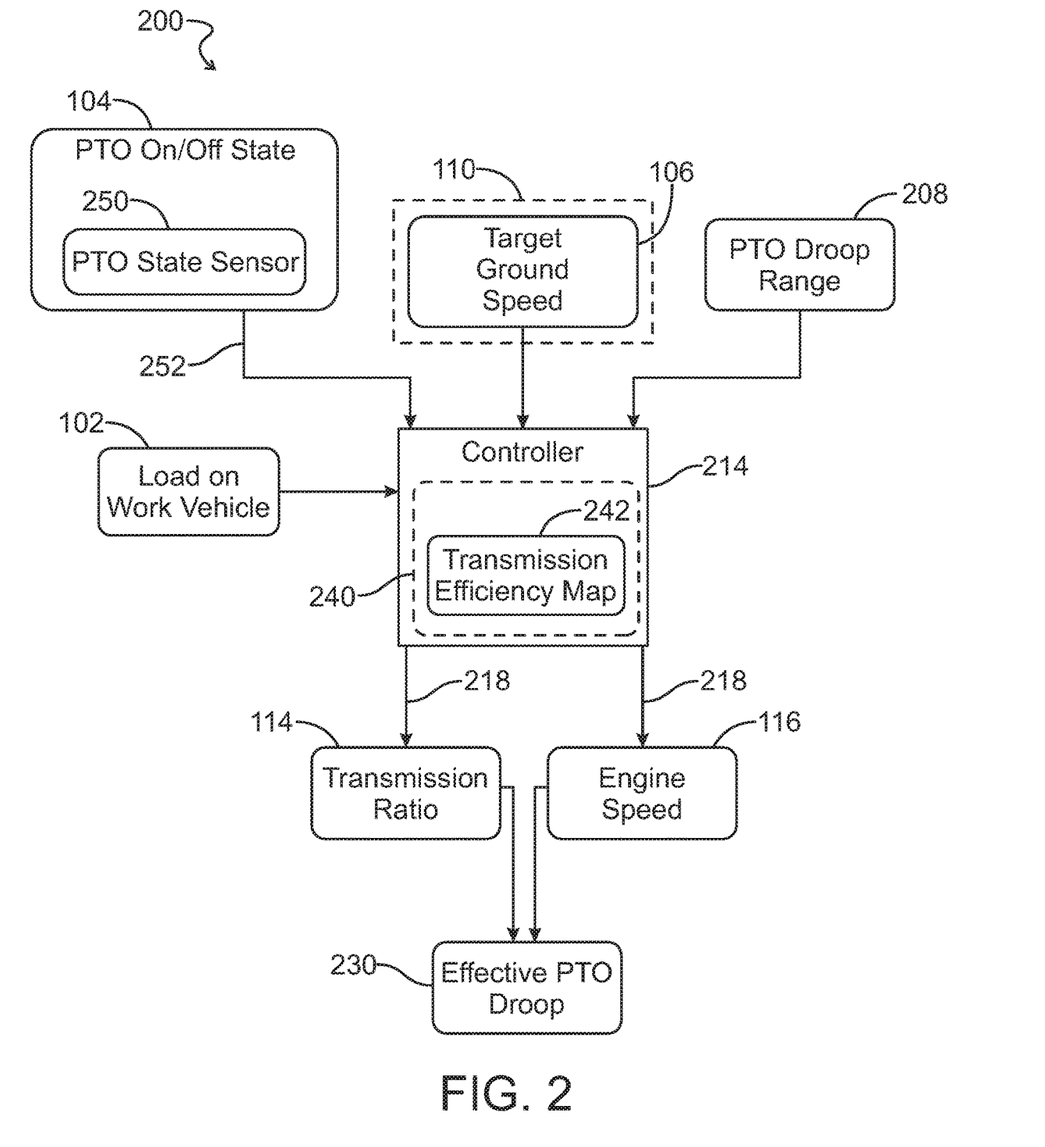
FIG. 2 is a block diagram representing an exemplary adaptive power take-off (PTO) droop control system according to an embodiment as disclosed herein.

Referring to FIG. 2, a particular embodiment as disclosed herein shows an adaptive power take-off (PTO) droop control system 200 for the work vehicle having the engine directly mechanically coupled to the PTO device. Similar elements from the droop control system 100 may be numbered similarly and may function similarly to corresponding elements of the adaptive PTO droop control system 200.

The adaptive PTO droop control system 200 may optionally take into account some or all of the load 102 on the work vehicle, the PTO operating state 104, and the target ground speed 106 similar to the droop control system 100. The adaptive PTO droop control system 200, however, further takes into account a defined or otherwise dynamically determined PTO droop range 208, rather than a definitive (or fixed) PTO droop value 108 as with the previously described droop control system 100. The user interface 110 of the adaptive PTO droop control system 200 may be utilized by the operator of the work vehicle to select, e.g., the defined PTO droop range 208 and the target ground speed 106. The user interface 110 may further be configured to enable user selection of an initial target PTO speed 210. The target PTO speed 210 has a corresponding (e.g., functionally related) initial target engine speed 212.

Information regarding the load 102 on the work vehicle, the PTO operating state 104, the target ground speed 106, and the defined PTO droop range 208 may be received by a controller 214 of the adaptive PTO droop control system 200.

The controller 214 is configured to identify a maximum transmission ground drive efficiency along a selected power limited curve 216 and within the defined PTO droop range 208. In response to the identified maximum transmission ground drive efficiency 216 the controller 214 is configured to generate control signals 218 for controlling the transmission ratio 114 and the engine speed 116 to adjusted target values corresponding with the identified maximum transmission ground drive efficiency 216.

For example, the control signals 218 may adjust the engine speed 116 from an actual engine speed 220 (substantially in real-time) to an adjusted target engine speed 222 and further adjust the transmission ratio 114 from an actual transmission ratio 224 (substantially in real-time) to an adjusted target transmission ratio 226. The adjusted target engine speed 222 and the adjusted target transmission ratio 226 may be respectively referred to as the adjusted target values 222, 226 of the engine speed 116 and the transmission ratio 114. The adjusted target engine speed 222 and the adjusted target transmission ratio 226 correspond to an effective PTO droop value 230 within the defined PTO droop range 208. The maximum transmission ground drive efficiency 216 corresponds to the effective PTO droop value 230.

The adaptive PTO droop control system 200 may further comprise a data storage 240 integrated with or otherwise functionally linked to the controller 214. The maximum transmission ground drive efficiency 216 may be identified by reference to a transmission efficiency map 242 retrievably stored in the data storage 240. The controller 214 may in an embodiment be configured to generate the transmission efficiency map 242 based on recorded transmission ground drive efficiency values over time correlated to different operating conditions. In other words, the transmission efficiency map 242 may be developed and further calibrated over time using learning techniques, rather than being predetermined and fixed in memory, although either embodiment is within the scope of viable embodiments according to the present disclosure. The transmission efficiency map 242 may be retrieved based on the selected target ground speed 106. Additionally, the control signals 218 generated by the controller 214 for controlling the engine speed 116 and the transmission ratio 114 to adjusted target values 222, 226 corresponding with the maximum transmission ground drive efficiency 216 may be selectively enabled or disabled by the user via for example the user interface 110.

The engine speed 116 may for example be adjusted as a function of some or all of the initial target engine speed 212, the actual engine speed 220, the PTO droop range 208, and the transmission efficiency map 242, but is not limited to these inputs unless otherwise specifically noted. The transmission ratio 114 may for example be adjusted as a function of some or all of the target ground speed 106, the PTO droop range 208, and the transmission efficiency map 242, but is not limited to these inputs unless otherwise specifically noted. The engine speed 116 and the transmission ratio 114 are not tied to a single droop value, like the droop control system 100 shown in FIG. 1, rather they become control outputs with a goal of attaining the maximum transmission ground drive efficiency 216 based on the effective PTO droop value 230 within the defined PTO droop range 208 being flexible.

A transmission efficiency may be based on a function of the engine speed 116 and the transmission ratio 114. The transmission efficiency is flexible due to the flexibility of the effective PTO droop value 230. This flexibility enables the transmission efficiency to become optimal or maximized by adjusting the engine speed 116 and the transmission ratio 114 to attain the maximum transmission ground drive efficiency 216.

The adaptive PTO droop control system 200 may optionally further comprise a PTO state sensor 250 configured to provide input signals 252 to the controller 214 to indicate whether or not the PTO device is presently engaged (e.g., to identify the PTO operating state 104).

Figure 3:
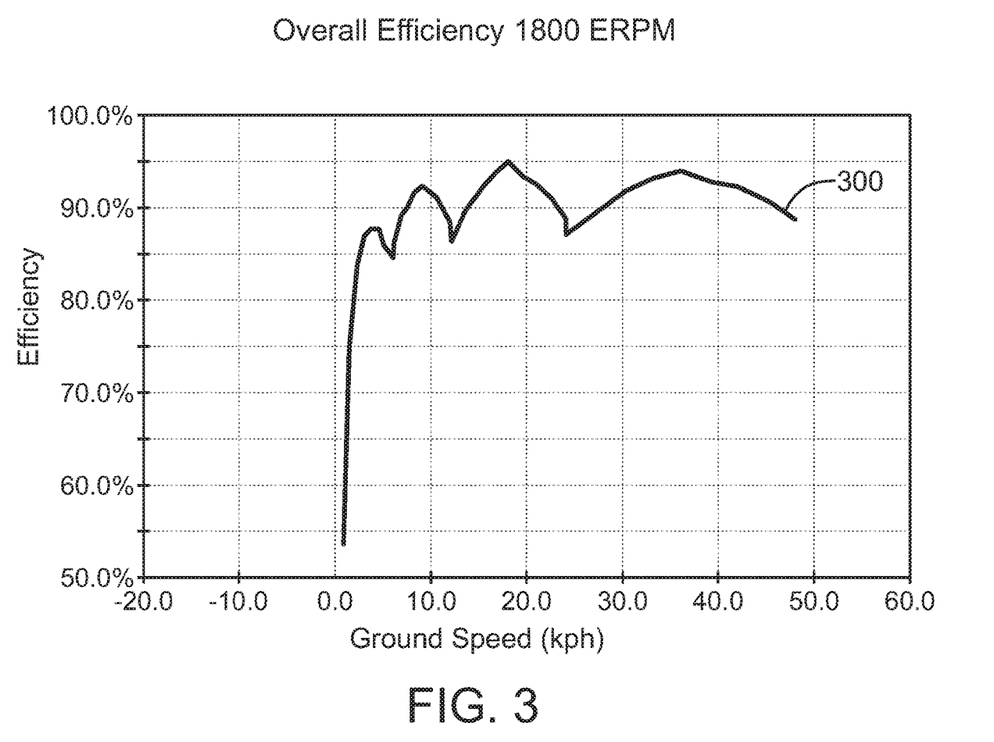
FIG. 3 is a graphical representation of an exemplary transmission ground drive efficiency curve for a self-propelled work vehicle according to an embodiment as disclosed herein.

Referring to FIG. 3, an exemplary graph of a transmission efficiency curve 300 is shown for a fixed engine speed 116 of 1800 rpm. The transmission efficiency curve 300 may also be referred to herein as the power limited curve 300. It should be noted that whereas the transmission efficiency curve and droop curves/ranges are illustrated in the form of plots, it is not necessary that such plots be graphically generated or otherwise stored for implementation of the methods described herein. Rather, the terms power limited curve, transmission efficiency curve, or droop curve as used herein may be understood to further encompass a function, series of functions, or table of values correlating, e.g., engine speed 116 with transmission ratio 114.

As illustrated, varying the transmission ratio 114 at the fixed engine speed 116 results in differing target ground speeds 106 (shown on the x-axis). The transmission efficiency curve 300 may correspond to a particular operating condition or transmission ground drive efficiency values over time correlated to different operating conditions. The transmission efficiency map 242 may be generated or otherwise implemented with multiple engine speeds 116 plotted on a third axis (i.e., with respect to a third dimension), wherein the result is a topographical surface with local maximum efficiencies for a given desired ground speed 116.

PTO droop is the shape of the transmission efficiency curve 300 (e.g., its slope when the PTO is operating).

Figure 4:
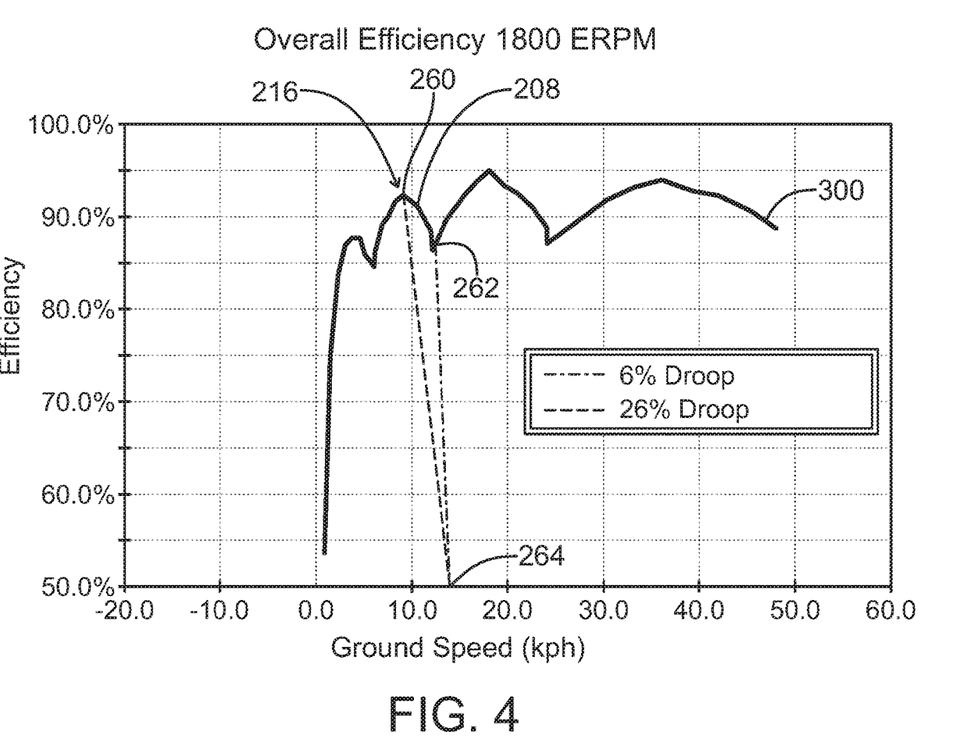
FIG. 4 is a graphical representation of the transmission efficiency curve of FIG. 3 illustrating positive droop values in an exemplary droop range according to an embodiment as disclosed herein.

Referring to FIG. 4, the transmission efficiency curve 300 is illustrated including the defined PTO droop range 208. The defined PTO droop range 208 may be defined between a first droop bound 260 and a second droop bound 262. As illustrated, for a given ground speed 264 the defined PTO droop range 208 may intersect the transmission efficiency curve 300 to drive different resultant transmission ground drive efficiencies. This is a simplified explanation of how droop works, or more specifically how positive droop works, but it demonstrates the defined PTO droop range 208 is capable of covering a minimum transmission ground drive efficiency and the maximum transmission ground drive efficiency 216 (when only positive droop is present or otherwise when only positive droop concepts are implemented).

The maximum transmission ground drive efficiency 216 in various embodiments may be attained via either or both of positive droop and negative droop as further discussed below. Positive droop may be a reactive aspect of detecting the load 102 (real-time), the target ground speed 106, the initial target PTO speed 210, and/or the actual engine speed 220 and responding accordingly. Positive droop is illustrated by the defined PTO droop range 208 shown in FIG. 4.

Figure 5:
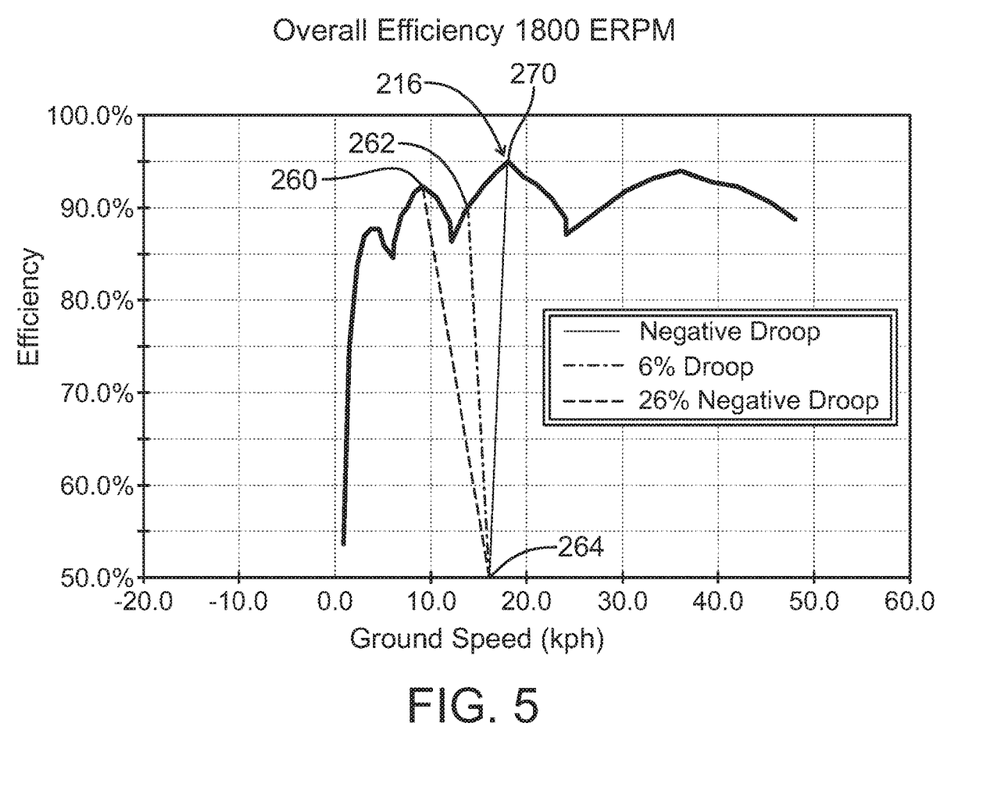
FIG. 5 is a graphical representation of the transmission efficiency curve of FIG. 4 including negative droop values in an exemplary droop range according to an embodiment as disclosed herein.

Referring to FIG. 5, the concept of negative droop may further be implemented in accordance with certain embodiments as disclosed herein. Negative droop, as illustrated by the negative droop point 270, may involve a proactive aspect for predicting the load 102 before it occurs (e.g., future load). Negative droop may also involve a proactive aspect for reaching the maximum transmission ground drive efficiency 216 by increasing the target ground speed 106. As illustrated in FIG. 5, the maximum transmission ground drive efficiency 216 occurs at a speed (e.g., 18 kph) much closer to the target ground speed 106 (e.g., 16 kph)) rather than, as shown in FIG. 4, the maximum transmission ground drive efficiency 216 occurs at a speed (e.g., 9 kph) much less than the target ground speed 106. Positive droop in such an instance would lead to a large amount of speed reduction and would thus be counterintuitive from productivity and maximization of efficiency standpoints.

Figure 6:
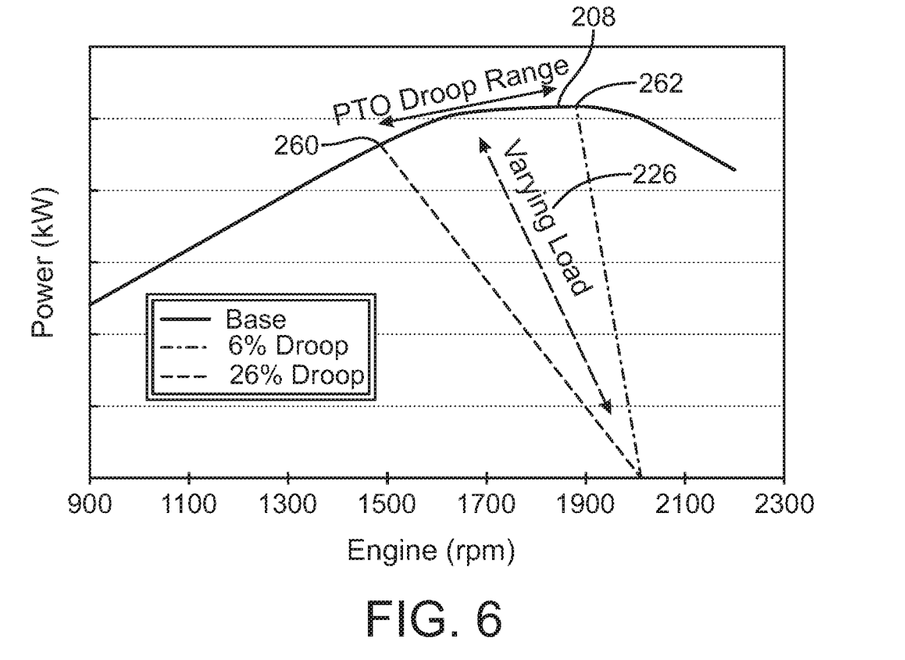
FIG. 6 is a graphical representation of an engine speed of a self-propelled work vehicle versus power and including a droop range according to an embodiment as disclosed herein.

Referring to FIG. 6, an exemplary engine speed of a self-propelled work vehicle is presented versus power and including a defined PTO droop range 208 between a first droop bound 260 and a second droop bound 262. As elsewhere stated herein, the represented first droop bound of 6% and the represented second droop bound of 26% are merely illustrative and are not intended as limiting on the scope of the present disclosure unless otherwise specifically noted. The power generated by the engine changes responsive to corresponding changes in the load 102 and the engine speed 116.

Figure 7:
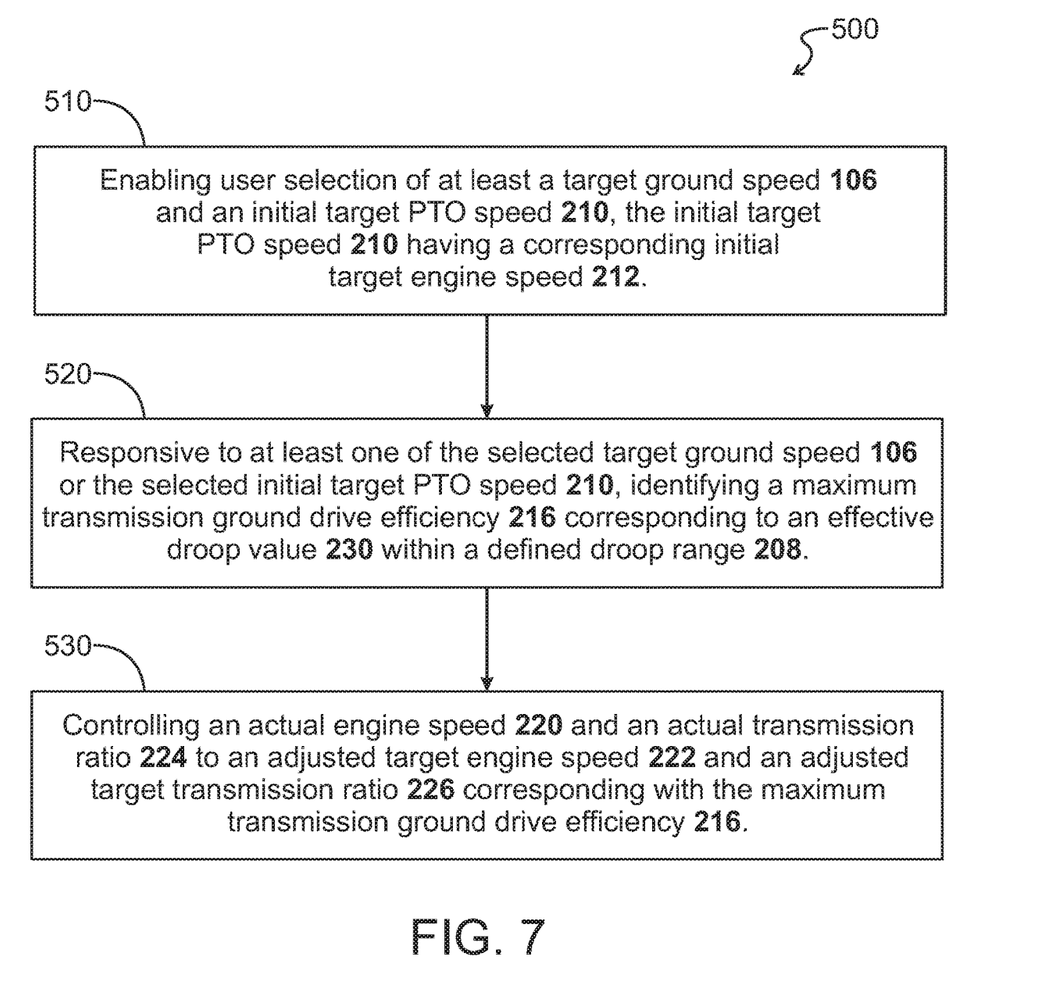
FIG. 7 is block diagram representing an exemplary method of adaptive PTO droop control for a self-propelled work vehicle having an engine directly mechanically coupled to a PTO device according to an embodiment as disclosed herein.

Referring to FIG. 7, a block diagram of a method 500 of adaptive PTO droop control for the work vehicle is shown. The method 500 includes a step of enabling 510 user selection of at least a target ground speed 106. The method 500 includes a step of, responsive to at least the selected target ground speed 106, identifying 520 a maximum transmission ground drive efficiency 216 corresponding to an effective PTO droop value 230 within a defined PTO droop range 208. The method 500 further includes a step of controlling 530 an actual engine speed 220 and an actual transmission ratio 224 to respective adjusted target values 222, 226 corresponding with the maximum transmission ground drive efficiency 216.

The maximum transmission ground drive efficiency 216 of the method 500 may be identified by reference to a predetermined droop curve 300 represented in a transmission efficiency map 242 retrievably stored in association with the work vehicle.

The transmission efficiency map 242 of the method 500 may in certain embodiments be generated for the work vehicle based on recorded or modeled transmission ground drive efficiency values over time correlated to different operating conditions.

The transmission efficiency map 242 of the method 500 may be retrieved based on a selected target ground speed 206.

An initial target PTO speed 210 of the method 500 may be selectable by the user via a user interface 110 associated with the work vehicle. The PTO speed 210, as previously mentioned, has a corresponding initial target engine speed 212.

The defined PTO droop range 208 of the method 500 may be further selectable by the user via the user interface 110.

The control step of the method 500 may be selectively enabled or disabled by the user via the user interface 110.

A PTO operating state 104 of the method 500 may be detected via input signals 252 from a PTO state sensor 250 indicating whether the PTO device is engaged.

The method 500 may further comprise reacting to a load 102 on the engine and reactively changing the adjusted target values 222, 226 corresponding with the maximum transmission ground drive efficiency 216.

The method 500 may further comprise anticipating a load 102 on the engine and proactively changing the adjusted target values 222, 226 corresponding with the maximum transmission ground drive efficiency 216.

The load on the vehicle may for example be sensed by a sensor or may be calculated or extrapolated by the controller based upon for example operational data provided from the self-propelled work vehicle and/or implements attached thereto.

A controller 112, 214 in various embodiments as disclosed herein may include or otherwise be associated with a processor, a computer readable medium, a communication unit, data storage such as for example a database network, and the aforementioned user interface 110 or control panel having a display. An input/output device, such as a keyboard, joystick or other user interface tool, may be provided so that the human operator may input instructions to the controller 112, 214. It is understood that the controller described herein may be a single controller having all of the described functionality, or it may include multiple controllers wherein the described functionality is distributed among the multiple controllers.

Various operations, steps or algorithms as described herein can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller 112, 214, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The term "user interface" 110 as used herein may broadly take the form of a display unit and/or other outputs from the system such as indicator lights, audible alerts, and the like. The user interface may further or alternatively include various controls or user inputs (e.g., a steering wheel, joysticks, levers, buttons) for operating the work vehicle, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A method of adaptive power take-off (PTO) droop control for a self-propelled work vehicle having an engine directly mechanically coupled to a PTO device, the method comprising:
    enabling user selection of at least a target ground speed;
    determining a first droop bound and a second droop bound as inputs for at least defining a droop range;
    responsive to at least the selected target ground speed, identifying a maximum transmission ground drive efficiency corresponding to any of a plurality of effective droop values within the defined droop range, wherein the maximum transmission ground drive efficiency is identified by reference to portions of a transmission ground drive efficiency curve corresponding to the defined droop range; and
    controlling an actual engine speed and an actual transmission ratio to respective adjusted target values corresponding with the maximum transmission ground drive efficiency.

2. The method of claim 1, wherein:
    the transmission ground drive efficiency curve is represented in a transmission efficiency map retrievably stored in association with the work vehicle.

3. The method of claim 2, wherein:
    the transmission efficiency map is generated for the work vehicle based on recorded or modeled transmission ground drive efficiency values over time correlated to different operating conditions.

4. The method of claim 2, wherein:
    the transmission efficiency map is retrieved based on the selected target ground speed.

5. The method of claim 2, wherein:
    an initial target PTO speed is selectable by the user via a user interface associated with the work vehicle, the PTO speed having a corresponding initial target engine speed.

6. The method of claim 5, wherein:
    the defined droop range is further selectable by the user via the user interface.

7. The method of claim 5, wherein:
    the step of controlling is selectively enabled or disabled by the user via the user interface.

8. The method of claim 2, wherein:
    a PTO state is detected via input signals from a PTO state sensor indicating whether the PTO device is engaged.

9. The method of claim 2, further comprising:
    reacting to a load on the engine and reactively changing the adjusted target values corresponding with the maximum transmission ground drive efficiency.

10. The method of claim 2, further comprising:
    anticipating a load on the engine and proactively changing the adjusted target values corresponding with the maximum transmission ground drive efficiency.

11. An adaptive power take-off (PTO) droop control system for a self-propelled work vehicle having an engine directly mechanically coupled to a PTO device, the system comprising:
    a user interface configured to enable user selection of an initial target PTO speed, the PTO speed having a corresponding initial target engine speed; and
    a controller configured to
        determine a first droop bound and a second droop bound as inputs for at least defining a droop range,
        identify a maximum transmission ground drive efficiency within the defined droop range, wherein the maximum transmission ground drive efficiency is identified by reference to portions of a transmission ground drive efficiency curve corresponding to the defined droop range, and
        to generate control signals for controlling an actual engine speed and an actual transmission ratio to an adjusted target engine speed and an adjusted target transmission ratio corresponding with the maximum transmission ground drive efficiency.

12. The system of claim 11, further comprising:
    a data storage functionally linked to the controller, wherein the maximum transmission ground drive efficiency is identified by reference to a transmission efficiency map retrievably stored in the data storage.

13. The system of claim 12, wherein:
    the defined droop range is further selectable by the user via the user interface.

14. The system of claim 13, wherein:
    the control signals are selectively enabled or disabled by the user via the user interface.

15. The system of claim 12, further comprising:
    a PTO state sensor configured to provide an input to the controller indicating whether the PTO device is engaged.

16. The system of claim 12, wherein:
    the control signals generated by the controller are at least one of proactive or reactive based at least in part on the transmission efficiency map.

17. The system of claim 16, wherein:
    the controller is configured to anticipate a future load on the engine and proactively generate the control signals.

18. The system of claim 16, wherein:
    the controller is configured to reactively generate the control signals based at least in part on a real-time load on the engine.

19. An adaptive power take-off (PTO) droop control system for a self-propelled work vehicle having an engine directly mechanically coupled to a PTO device, the system comprising:
    a user interface configured to enable user selection of an initial target PTO speed, the PTO speed having a corresponding initial target engine speed;
    a controller configured to identify a maximum transmission ground drive efficiency within a defined droop range, and to generate control signals for controlling an actual engine speed and an actual transmission ratio to an adjusted target engine speed and an adjusted target transmission ratio corresponding with the maximum transmission ground drive efficiency; and a data storage functionally linked to the controller, wherein the maximum transmission ground drive efficiency is identified by reference to a transmission efficiency map retrievably stored in the data storage, and wherein the transmission efficiency map is retrieved based on a selected target ground speed.

20. The system of claim 19, wherein:

the controller is configured, based at least in part on the transmission efficiency map, to: anticipate a future load on the engine and proactively generate the control signals; and/or reactively generate the control signals based at least in part on a real-time load on the engine.

\* \* \* \* \*